United States Patent [19]

Kimura et al.

[11] Patent Number: 5,231,249
[45] Date of Patent: Jul. 27, 1993

[54] INSULATED POWER CABLE

[75] Inventors: Hitoshi Kimura; Tetsuo Matsumoto, both of Ichihara; Michihiro Shimada, Nagoya, all of Japan

[73] Assignee: The Furukawa Electric Co., Ltd., Tokyo, Japan

[21] Appl. No.: 773,667

[22] PCT Filed: Feb. 22, 1991

[86] PCT No.: PCT/JP91/00231

§ 371 Date: Oct. 17, 1991

§ 102(e) Date: Oct. 17, 1991

[87] PCT Pub. No.: WO91/13446

PCT Pub. Date: Sep. 5, 1991

[30] Foreign Application Priority Data

Feb. 23, 1990 [JP] Japan .................................. 2-43326

[51] Int. Cl.$^5$ ........................ H01B 9/02; H02G 15/08
[52] U.S. Cl. ........................ 174/105 SC; 174/75 R; 174/75 C; 174/84 R; 174/120 SC
[58] Field of Search .................. 174/120 SC, 102 SC, 174/105 SC, 84 R, 75 C, 75 R

[56] References Cited

U.S. PATENT DOCUMENTS

| | | | |
|---|---|---|---|
| 3,646,248 | 2/1972 | Ling et al. | 174/120 SC |
| 3,777,048 | 12/1973 | Traut | 174/84 R X |
| 4,150,193 | 4/1979 | Burns, Jr. | 174/102 SC X |
| 4,342,880 | 8/1982 | Castelli et al. | 174/36 |
| 4,370,518 | 1/1983 | Guzy | 174/84 R |
| 4,520,230 | 5/1985 | Uesugi et al. | 174/107 |
| 4,801,766 | 1/1989 | Aida et al. | 174/120 SC |

FOREIGN PATENT DOCUMENTS

| | | |
|---|---|---|
| 995314 | 8/1976 | Canada .......................... 174/84 R |
| 208353 | 1/1987 | European Pat. Off. . |
| 0318792 | 11/1988 | Fed. Rep. of Germany . |

OTHER PUBLICATIONS

Chemical Abstracts, vol. 107, No. 4, Jul. 27, 1987, Columbus, Ohio, US; Abstract No. 24644, p. 67 of SU-A-1 270 159 (Scientific Research Institute of the Rubber Industry), Nov. 15, 1986.

Primary Examiner—Morris H. Nimmo
Attorney, Agent, or Firm—Frishauf, Holtz, Goodman & Woodward

[57] ABSTRACT

There is provided an olefin resin composition for power cables which contains an olefin resin and m-(tert-butylperoxyisopropyl)-isopropylbenzene and/or p-(tert-butylperoxyisopropyl)-isopropylbenzene. A crosslinking agent of this resin composition is suitably used for at least one of layers including semiconductor layers and an insulation layer in the power cables or around conductors at a joint between the power cables, whereby the high-temperature properties of the power cables can be improved.

20 Claims, 1 Drawing Sheet

INSULATED POWER CABLE

TECHNICAL FIELD

The present invention relates to a resin composition suitably used for an insulation layer and semiconductor layers of rubber or plastic insulated power cables, power cables improved in high-temperature properties by using the resin composition, and a joint of the power cables.

BACKGROUND ART

A conventional rubber or plastic insulated power cable (hereinafter referred to simply as power cable) generally comprises a cable core which includes a conductor clad with an inner semiconductor layer and an insulation layer, or with an inner semiconductor layer, an insulation layer, and an outer semiconductor layer. These individual layers are formed by extruding a resin composition, which is based on an olefin resin blended with a crosslinking agent, onto the outer peripheral surface of the conductor by means of an extruder, then heating the resultant structure under pressure to decompose the crosslinking agent blended with the base resin, so that crosslinking is effected by means of the resultant radicals.

Conventionally, moreover, power cables of the 154-kV class or higher are connected by the so-called moulded joint method as follows.

First, the respective conductors of two power cables are exposed at their end portions, and those portions of inner semiconductor layers, insulation layers, and outer semiconductor layers near the exposed end portions of the conductors are cut substantially in the desired shape of a cone. Thereafter, the exposed conductors are connected to each other, and a semiconductive tape, which is made of an olefin resin composition compounded with the crosslinking agent, or a heat-shrinkable semiconductive tube made of the aforesaid resin composition is wound or put on the conductor joint and the vicinities thereof to form an inner semiconductor layer. Then, the inner semiconductor layer is wound with an insulation tape made of an olefin resin composition compounded with the crosslinking agent, or is coated with an insulating olefin resin compound blended with the crosslinking agent by extrusion into a mold, thereby forming an insulation layer. Further, this insulation layer is wound with the semiconductive tape or fitted with the heat-shrinkable semiconductive tube in the same manner as in the formation of the inner semiconductor layer, thereby forming an outer semiconductor layer. After these individual layers are formed in this manner, they are crosslinked by heating under pressure, whereby the power cables are connected together.

Conventionally, dicumyl peroxide is used as the crosslinking agent for the olefin resin, which constitutes the insulation layers and semiconductor layers of the power cables and a joint thereof.

In manufacturing the power cables, resins having higher melting points than conventional ones are tentatively used as materials for the insulation layer and semiconductor layers so that the high-temperature properties of the resultant power cables, and therefore, the reliability thereof, are improved. In particular, this improvement is in a great demand for high-voltage power cables. However, the preset temperature of the extruder should be heightened in the case where the insulation layer and semiconductor layers made of a resin with a high melting point are extruded. In this case, the following problem may arise under some conditions.

The resin composition is heated due to the shearing force of the screw of the extruder, so that its resin temperature becomes too high. Accordingly, the crosslinking agent such as dicumyl peroxide in the resin composition is partially decomposed, so that fine, amber-colored contaminants or the so-called "amber" comes about in an extruded piece. This "amber" triggers insulation breakdown, thus lowering the properties, and therefore, the reliability, of the power cables. If the "amber" is frequent, moreover, protrusions develop on the surface of the extruded piece, thereby spoiling the external appearance of the cables.

Moreover, during the manufacture of the power cable core or the manufacture of the tape for the taped moulded joint or of the insulation layer by extrusion in the extrusion moulded joint process, a meshed screen for removing contaminants is attached to the distal end portion of the extruder. The mesh size of this screen tends to be diminished in order to reduce the amount of contaminants in the insulation layer and the like, thereby improving the reliability of the power cables and the cable joint. To remove contaminants by means of the fine-mesh screen, therefore, it is necessary to pass the resin composition through the screen meshes under high pressure. In this case, however, the resin composition is heated due to a shearing force produced when it passes through the screen meshes as the resin pressure increases. As a result, the resin temperature becomes so high that the "amber" increases.

In manufacturing the power cables, therefore, the preset temperature of the extruder for the formation of the insulation layer and semiconductor layers should be set low enough to prevent "amber." This is the reason why the base resin has to be bound to an olefin resin with a relatively low melting point (about 110° C. at the maximum). In order to prevent the "amber," moreover, even prevailing olefin resins require very strict preset temperature control.

The insulation layer and semiconductor layers of the power cables contain 2-phenyl-2-propanol which is a decomposition product of dicumyl peroxide for use as the crosslinking agent. This 2-phenyl-2-propanol is decomposed to produce water when the power cables are heated to 140° C. or more. The produced water increases the water content of the power cables, thereby lowering the insulation breakage characteristics of the cables.

Thus, in manufacturing the power cables, the "amber" is caused by the decomposition of the crosslinking agent during the extrusion coating of the insulation layer and semiconductor layers, and the lowering of the properties and reliability of the power cables causes a critical problem. Heretofore, however, there have not been found any power cables which can enjoy high reliability without entailing the "amber" when the insulation layer and semiconductor layers are formed with use of a higher preset temperature of the extruder.

DISCLOSURE OF THE INVENTION

The object of the present invention is to provide an olefin resin composition for power cables, power cables using the same, and a joint of the power cables, which are free from "amber" caused by the decomposition of a crosslinking agent, and which can achieve high reliability even though an insulation layer and semiconductor layers are formed on the outer peripheral surface of a conductor at a preset temperature higher than in the conventional case.

According to the present invention, there is provided an olefin resin composition for power cables, which contains an olefin resin and m-(tert-butylperoxyisopropyl)-isopropylbenzene and/or p-(tert-butylperoxyisopropyl)-ispropylbenzene, the loading ratio between these materials preferably ranging from 100:0.5 to 100:5 by weight, further preferably from 100:1.5 to 100:3 by weight.

A crosslinked structure of this resin composition is suitably applied to at least one layer, out of semiconductor layers and insulation layers formed in the power cables and on conductors at a joint of the power cables.

The resin composition of the present invention is further compounded with one or more antioxidants selected from a group including 4,4'-thiobis(3-methyl-6-tert-butylphenol), bis[2-methyl-4-(3-n-alkylthiopropionyloxy)-5-tert-butylphenyl]sulfide, 2,5-di-tert-butyl hydroquinone, 2,6-di-tert-butyl-p-cresol, 2,2'-thiodiethylenebis-[3-(3,5-di-tert-butyl-4-hydroxyphenyl)-propionate], dilauryl thiodipropionate, and distearyl thiodipropionate. Preferably, the loading of the antioxidant(s) may range from 0.05 to 1.0 part by weight as compared with 100 parts by weight of the olefin resin.

If m-(tert-butylperoxyisopropyl)-isopropylbenzene and/or p-(tert-butylperoxyisopropyl)-isopropylbenzene is used as the crosslinking agent of the olefin resin composition for power cables of the present invention, the preset temperature of the extruder can be set higher than in the case where an olefin resin composition containing dicumyl peroxide is used as the crosslinking agent. It is possible, therefore, to use an olefin resin with a high melting point (about 110° C. or more) which conventionally has not been easily applicable. Thus, the high-temperature properties and durability of the power cables can be improved, and the reliability of the power cables can be considerably improved.

Since the power cables of the present invention do not use dicumyl peroxide as the crosslinking agent, moreover, 2-phenyl-2-propanol as its decomposition product is not contained in the insulation layers and the like. Even when the power cables are heated to 140° C. or more, therefore, they produce little water, so that their insulation breakage characteristics can be restrained from lowering.

Since the olefin resin composition can be kneaded at a higher temperature, furthermore, the mesh size of a meshed screen for the removal of contaminants, which is attached to an extrusion orifice of the extruder used in the manufacture of a power cable core, manufacture of a tape or tube for a taped moulded joint, and extrusion in the extrusion moulded joint process, can be made finer. Accordingly, the amount of contaminants in the insulation layers and semiconductor layers in the power cables and at the joint of the power cables can be reduced, so that the reliability of the power cables can be considerably improved.

BEST MODE OF CARRYING OUT THE INVENTION

Figure 1:
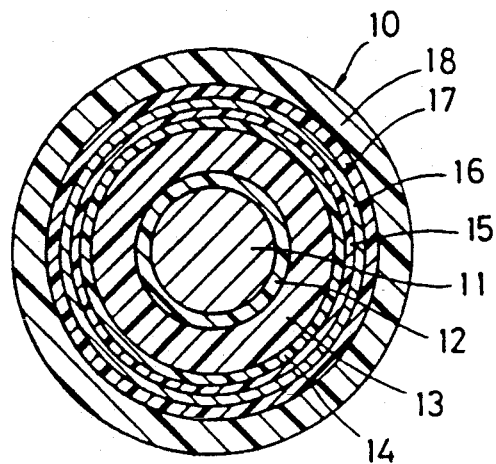
FIG. 1 is a cross-sectional view showing an arrangement of a power cable according to the present invention.

The inventors hereof made an examination to achieve the above object, and completed the present invention by finding out the fact that if a resin composition prepared by compounding an olefin resin with m- and/or p-(tert-butylperoxyisopropyl)-isopropylbenzene, as a crosslinking agent or agents, is used as a material of power cables and an inner semiconductor layer, insulation layer, and an outer semiconductor layer formed on conductors at a joint of the power cables, the preset temperature of an extruder for the formation of the insulation layer and the like can be set higher than in the case where dicumyl peroxide is used as a crosslinking agent.

The resin composition for power cables according to the present invention is obtained by compounding the olefin resin with m-(tert-butylperoxyisopropyl)-isopropylbenzene and/or p-(tert-butylperoxyisopropyl)-isopropylbenzene for use as the crosslinking agent(s).

Available olefin resins for the base of the resin composition include low-density polyethylene, very-low-density polyethylene, linear low-density polyethylene, ethylene propylene rubber, ethylene-ethyl acrylate copolymer, ethylene-vinyl acetate copolymer, ethylene-acrylic acid copolymer, and ethylene-styrene copolymer, for example. These materials may be used singly or in a combination of two or more. Preferably, low-density polyethylene is used for the insulation layer of the power cable, as mentioned later, and ethylene-vinyl acetate copolymer, ethylene-ethyl acrylate copolymer, or a mixture of these copolymers, or a mixture of polyethylene and one of the aforesaid copolymers is used for the inner semiconductor layer and the outer semiconductor layer.

m-(Tert-butylperoxyisopropyl)-isopropylbenzene and p-(tert-butylperoxyisopropyl)-isopropylbenzene, for use as the crosslinking agents to be compounded with the olefin resin composition, can be obtained by causing isopropyl α,α'-dimethylbenzylcarbinol of the meta- or para-type to react to tert-butyl hydroperoxide under the existence of an acid catalyst at 40° C. or thereabout. These materials are viscous liquids having a melting point of −10° C. or below. The respective structural formulas of m- and p-(tert-butylperoxyisopropyl)-isopropylbenzenes are given as follows:

Meta-type:

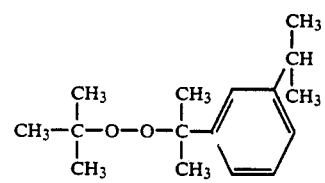

Para-type:

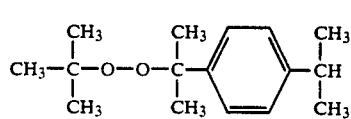

Also known as a crosslinking agent for the olefin resin is m-(tert-butylperoxyisopropyl)-isopropenylbenzene whose make-up resembles that of the aforesaid m-(tert-butylperoxyisopropyl)-isopropylbenzene or p-(tert-butylperoxyisopropyl)-isopropylbenzene. However, this compound has a reactive unsaturated group in its molecules, and 1-oxomethyl-3-isopropenylbenzene (hereinafter referred to as "acetophenone derivative") having an unsaturated bond in its substituting group, as a decomposition product, is inevitably subjected to a graft reaction with the olefin resin for use as a base polymer during a crosslinking reaction. Accordingly, the acetophenone derivative, having the unsaturated bond in its substituting group, cannot move in the base polymer. Thus, it is difficult for the aforesaid acetophenone derivative, having the unsaturated bond in its substituting group, to bloom on the interfaces of voids, contaminants, etc. in the insulation layer of the power cable. Practically, therefore, improvement of the insulation breakage characteristics of the power cable can hardly be expected.

Since m-(tert-butylperoxyisopropyl)-isopropylbenzene and p-(tert-butylperoxyisopropyl)-isopropylbenzene have no reactive unsaturated group in their molecules, the acetophenone derivative as the decomposition product never undergoes a graft reaction with the olefin resin as the base polymer during a crosslinking reaction. Accordingly, the acetophenone derivative can move in the base polymer. Thus, the aforesaid acetophenone derivative can bloom on the interfaces of voids, contaminants, etc. in the insulation layer of the power cable, thereby restraining partial electric discharge from the interfaces of voids, contaminants, etc., so that the insulation breakage characteristics of the power cable can be improved.

Thus, m- or p-(tert-butylperoxyisopropyl)-isopropylbenzene for use as the crosslinking agents of the present invention, and m-(tert-butylperoxyisopropyl)-isopropenylbenzene have considerably different functions and effects despite their similar make-ups.

Preferably, the loading of m-(tert-butylperoxyisopropyl)-isopropylbenzene and/or p-(tert-butylperoxyisopropyl)-isopropylbenzene compounded with the olefin resin ranges from 0.5 to 5 parts by weight as compared with 100 parts by weight of the olefin resin. If the loading is less than 0.5 part by weight, a crosslinking effect cannot be obtained. If the loading exceeds 5 parts by weight, on the other hand, the crosslinking advances to an excessive degree such that "amber" is liable to occur. Further preferably, the loading ranges from 1.5 to 3 parts by weight.

If the semiconductor layers are formed from the aforesaid olefin resin composition, conductive carbon is compounded with the olefin resin. Available conductive carbons for this purpose include, for example, Ketjen black, acetylene black, and furnace black that are conventionally used. Preferably, the loading of this conductive carbon ranges from 20 to 100 parts by weight as compared with 100 parts by weight of the olefin resin.

If necessary, moreover, the olefin resin may be mixed with an antioxidant, lubricant, or filler.

Available antioxidants include 4,4'-thiobis(3-methyl-6-tert-butylphenol), bis[2-methyl-4-(3-n-alkylthiopropionyloxy)-5-tert-butylphenyl]sulfide, 2,5-di-tert-butyl hydroquinone, 2,6-di-tert-butyl-p-cresol, 2,2'-thiodiethylenebis-[3-(3,5-di-tert-butyl-4-hydroxyphenyl)-propionate], dilauryl thiodipropionate, and distearyl thiodipropionate, for example. These materials may be used singly or in a combination of two or more. Among these antioxidants, 4,4'-thiobis(3-methyl-6-tert-butylphenol) and bis[2-methyl-4-(3-n-alkylthiopropionyloxy)-5-tert-butylphenyl]sulfide are preferred in particular.

Preferably, the loading of the antioxidant(s) ranges from 0.05 to 1.0 part by weight as compared with 100 parts by weight of the olefin resin. If the loading is less than 0.05 part by weight, oxidative deterioration of the insulation layer cannot be effectively prevented. If the loading exceeds 1.0 part by weight, on the other hand, the crosslinking reaction is retarded, so that the degree of crosslinking is lowered.

Available lubricants include stearic acid, oxyaliphatic acid, oleic acid amide, ethylene glycol monostearate, cetyl alcohol, and stearyl alcohol, for example.

Available fillers include the aforementioned conductive carbon, silicon halide, and zinc stearate, for example.

The resin composition of the present invention may be applied to rubber or plastic insulated power cables and a joint thereof, with improved high-temperature properties. More specifically, the semiconductor layers and insulation layers of the power cables may be formed by extrusion molding and crosslinking, or otherwise, the resin composition may be formed into a semiconductive tape or insulation tape so that the tape is wound around the conductors.

FIG. 1 shows an example of a cross-sectional configuration of the power cable according to the present invention. The power cable 10 can be manufactured as follows. An inner semiconductor layer 12 and an insulation layer 13, and if necessary, an outer semiconductor layer 14, are formed on the peripheral surface of a conductor 11 by a conventional method using the aforesaid resin composition. Thereafter, a semiconducting cloth tape 15, a metallic shielding layer 16, a hold-down tape 17, and a sheath layer 18 are further formed on the resultant structure.

Figure 2:
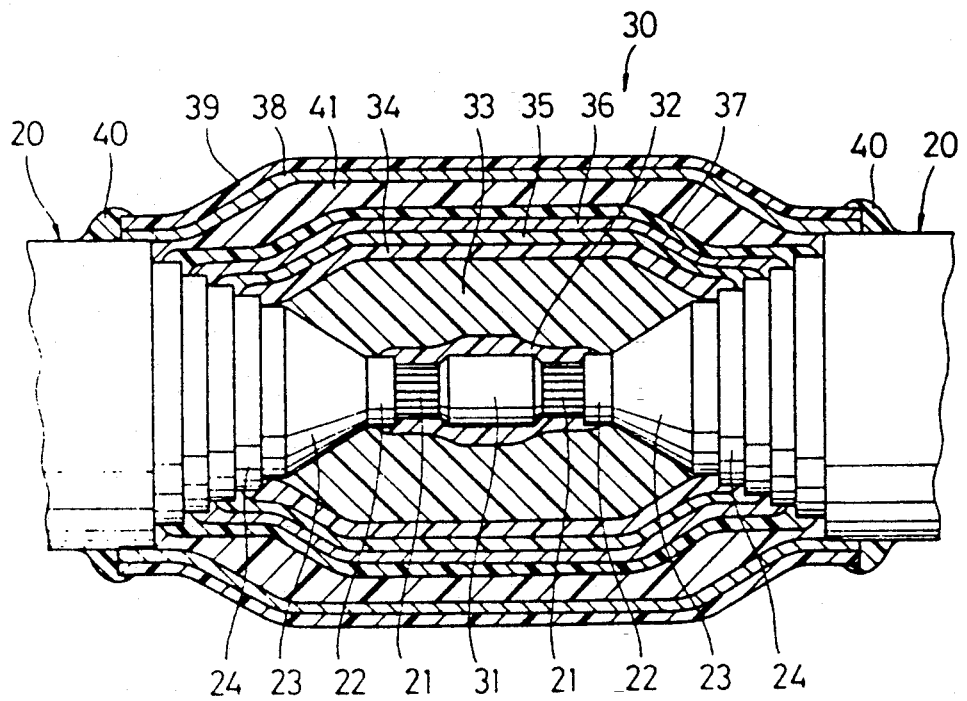
FIG. 2 is a partial sectional view showing an arrangement of a joint between power cables according to the present invention.

FIG. 2 shows an example of an arrangement of a joint 30 between power cables according to the present invention. Two power cables 20 can be connected by the conventional moulded joint method, for example. In this method, the respective ends of the cables 20 are first trimmed so that conductors 21, inner semiconductor layers 22, insulation layers 23, and outer semiconductor layers 24 are exposed individually, as shown in FIG. 2. Then, the two conductors 21 are connected to each other by means of a ferrule 31. The respective inner semiconductor layers 22, insulation layers 23, and outer semiconductor layers 24 of the two power cables 20 to be connected, which are not specifically restricted in material, should preferably be formed of a crosslinked structure of an olefin resin composition according to the present invention.

Then, a semiconductive tape or a heat-shrinkable semiconductive tube, made of the resin composition of the present invention, is wound or put on the conductors and fusion-bonded thereto, thereby forming an inner semiconductor layer 32, so that the inner semiconductor layers 22 at the opposite ends of the layer 32 are connected. After this inner semiconductor layer 32 is formed in this manner, moulds for resin moulding are mounted so that an insulation layer 33, made of the resin composition of the present invention, is formed on the peripheral surface of the layer 32 by heat moulding and then heat-crosslinked. An outer semiconductor layer 34, a conductive selfadhesive tape 35, a shield layer 36, and an anticorrosion tape 37 are wound successively around the insulation layer 33, thus forming individual layers. The resin composition of the present invention is applied to the outer semiconductor layer 34. A protective tube, formed of a copper tube 38 and an anticorrosion layer 39, is mounted on the resultant structure, and is sealed by means of hand-wound anticorrosion layers 40. Thereafter, the gap between the tape 37 and the protective tube is filled up with a waterproof compound layer 41.

Preferably, a composition of the following formulation is used for the insulation layers 13 and 23 of the power cables and the insulation layer 33 at the joint of the power cables. This composition contains 100 parts by weight of low-density polyethylene (LDPE) with M.I. of 0.5 to 5.0 g/10 min and a density of 0.920 to 0.940 g/cm$^3$ compounded with 1.5 to 3 parts by weight of m-(tert-butylperoxyisopropyl)-isopropylbenzene and/or p-(tert-butylperoxyisopropyl)-isopropylbenzene, for use as the crosslinking agent or agents, and 0.05 to 1.0 part per weight of 4,4'-thiobis(3-methyl-6-tert-butylphenol). For high-voltage cables, in particular, it is advisable to use low-density polyethylene with a density of 0.925 to 0.94 g/cm$^3$.

Preferably, moreover, a composition of the following formulation is used for the inner semiconductor layers 12, 22 and 32 and the outer semiconductor layers 14, 24 and 34 of the power cables and at the joint of the power cables. This composition contains 100 parts by weight of ethylene-ethyl acrylate copolymer or ethylene-vinyl acetate copolymer with M.I. of 10 to 20 g/10 min and a density of 0.93 to 0.96 g/cm$^3$ compounded with 1.5 to 3 parts by weight of m-(tert-butylperoxyisopropyl)-isopropylbenzene and/or p-(tert-butylperoxyisopropyl)-isopropylbenzene, for use as the crosslinking agent or agents, 0.05 to 1.0 part per weight of 4,4'-thiobis(3-methyl-6-tert-butylphenol), and 20 to 100 parts by weight of acetylene black.

In the power cable 10 and the joint 30 of the present invention, the inner semiconductor layer, the insulation layer, and the outer semiconductor layer should preferably be each formed from the aforesaid olefin resin composition containing m-(tert-butylperoxyisopropyl)-isopropylbenzene and/or p-(tert-butylperoxyisopropyl)-isopropylbenzene, for use as the crosslinking agent or agents. However, at least one of these layers may be formed from the aforesaid olefin resin composition.

The half-life temperature (decomposition temperature to obtain any desired half-life period) of m-(tert-butylperoxyisopropyl)-isopropylbenzene or p-(tert-butylperoxyisopropyl)-isopropylbenzene, contained in the olefin resin composition which forms the insulation and the like of the power cable of the present invention, is higher than that of dicumyl peroxide. Therefore, the preset temperature of the extruder for the formation of the insulation layer and the like of the power cable can be heightened.

EMBODIMENTS (Embodiments 1 to 6 and Controls 1 to 8)

A 600-mesh screen was attached to an extrusion orifice, only resin compositions of the formulations shown in Table 1 were extruded into tapes of 200-μm thickness at the listed temperatures by means of an extruder, and the appearance of each resultant tape was visually observed. In Table 1, which shows the results of this visual observation, circles, crosses, and triangles represent articles with good appearance, defectives, and partial defectives, respectively. A crosslinking agent C for comparison is dicumyl peroxide (trademark: Percumyl D, produced by Nippon Fat and Oil Co., Ltd.), a crosslinking agent D for comparison is tert-butyl-cumyl peroxide (trademark: Perbutyl C, produced by Nippon Fat and Oil Co., Ltd.), a crosslinking agent E for comparison is 2,5-dimethyl 2,5-di(tert-butylperoxy) hexyne-3 (trademark: Perhexyne 25B, produced by Nippon Fat and Oil Co., Ltd.), and a crosslinking agent F for comparison is 1-(2-tert-butylperoxypropyl)-2-isopropenylbenzene (produced by AKZO Inc.).

TABLE 1

| | | | Embodiment 1 | Embodiment 2 | Embodiment 3 | Embodiment 4 | Embodiment 5 | Embodiment 6 | Control 1 |
|---|---|---|---|---|---|---|---|---|---|
| Insulation layer | Low-density[1] polyethylene | | 100 | 100 | 100 | 100 | 100 | 100 | 100 |
| | Crosslinking agent A[2] of invention | | 0.5 | 2 | 5 | — | — | — | — |
| | Crosslinking agent[3] mixuture B of invention | | — | — | — | 0.5 | 3 | 5 | — |
| | Crosslinking agent C[4] for comparison | | — | — | — | — | — | — | 0.5 |
| | Crosslinking agent D[5] for comparison | | — | — | — | — | — | — | — |
| | Crosslinking agent E[6] for comparison | | — | — | — | — | — | — | — |
| | Crosslinking agent F[7] for comparison | | — | — | — | — | — | — | — |
| | Antioxidant[8] | | 0.3 | 0.3 | 0.3 | 0.3 | 0.3 | 0.3 | 0.3 |
| Evaluation of insulation layer | Preset temperature of extruder | 120° C. | ○ | ○ | ○ | ○ | ○ | ○ | ○ |
| | | 125° C. | ○ | ○ | ○ | ○ | ○ | ○ | ○ |
| | | 130° C. | ○ | ○ | ○ | ○ | ○ | ○ | Δ |
| | | 135° C. | ○ | ○ | ○ | ○ | ○ | ○ | X |
| | | 140° C. | ○ | ○ | Δ | ○ | ○ | Δ | X |

| | | Control 2 | Control 3 | Control 4 | Control 5 | Control 6 | Control 7 | Control 8 |
|---|---|---|---|---|---|---|---|---|
| Insulation layer | Low-density[1] polyethylene | 100 | 100 | 100 | 100 | 100 | 100 | 100 |
| | Crosslinking agent A[2] of invention | — | — | — | — | — | — | — |
| | Crosslinking agent[3] mixuture B of invention | — | — | — | — | — | — | — |
| | Crosslinking agent C[4] | 2 | 5 | — | — | — | — | — |

TABLE 1-continued

|  |  |  |  |  |  |  |  |  |  |
|---|---|---|---|---|---|---|---|---|---|
|  | for comparison |  |  |  |  |  |  |  |  |
|  | Crosslinking agent D[5) for comparison | — | — | 2 | 5 | — | — | — |  |
|  | Crosslinking agent E[6) for comparison | — | — | — | — | 2 | 5 | — |  |
|  | Crosslinking agent F[7) for comparison | — | — | — | — | — | — | 2 |  |
|  | Antioxidant[8) | 0.3 | 0.3 | 0.3 | 0.3 | 0.3 | 0.3 | 0.3 |  |
| Evaluation of insulation layer | Preset temperature of extruder | 120° C. | ○ | ○ | ○ | ○ | ○ | ○ | ○ |
|  |  | 125° C. | ○ | ○ | ○ | ⊙ | ○ | ○ | ○ |
|  |  | 130° C. | △ | △ | ○ | ○ | ○ | ○ | ○ |
|  |  | 135° C. | X | X | ○ | △ | ○ | △ | ○ |
|  |  | 140° C. | X | X | △ | △ | △ | △ | △ |

[1)]M.I. = 1.0 g/10 min density = 0.928 g/cm³
[2)]m-(tert-butylperoxyisopropyl)-isopropylbenzene
[3)]Mixture of m-(tert-butylperoxyisopropyl)-isopropylbenzene and p-(tert-butylperoxyisopropyl)-isopropylbenzene in the ratio 3:2 by weight
[4)]Dicumyl peroxide
[5)]Tert-butyl-cumyl peroxide
[6)]2,5-dimethyl 2,5-di(tert-butylperoxide) hexyne-3
[7)]1-(2-tert-butylperoxypropyl)-3-isopropenylbenzene
[8)]4,4'-thiobis(3-methyl-6-tert-butylphenol)

TABLE 2

|  |  | Embodiment 7 | Embodiment 8 | Embodiment 9 | Embodiment 10 | Embodiment 11 | Embodiment 12 | Control 9 |
|---|---|---|---|---|---|---|---|---|
| Inner semiconductor layer and outer semiconductor layer | Ethylene-ethyl acrylate copolymer[1) | 100 | 100 | 100 | 100 | 100 | 100 | 100 |
|  | Crosslinking agent A of invention[2) | 0.5 | 2 | 5 | — | — | — | — |
|  | Crosslinking agent[3) mixuture B of invention | — | — | — | 0.5 | 3 | 5 | — |
|  | Crosslinking agent C for comparison[4) | — | — | — | — | — | — | 0.5 |
|  | Crosslinking agent D for comparison[5) | — | — | — | — | — | — | — |
|  | Crosslinking agent E for comparison[6) | — | — | — | — | — | — | — |
|  | Crosslinking agent F for comparison[7) | — | — | — | — | — | — | — |
|  | Antioxidant[8) | 0.5 | 0.5 | 0.5 | 0.5 | 0.5 | 0.5 | 0.5 |
|  | Acetylene black | 60 | 60 | 60 | 60 | 60 | 60 | 60 |
| Insulation layer | Low-density[9) polyethylene | 100 | 100 | 100 | 100 | 100 | 100 | 100 |
|  | Crosslinking agent A of invention[2) | 0.5 | 2 | 5 | — | — | — | — |
|  | Crosslinking agent[3) mixuture B of invention | — | — | — | 0.5 | 3 | 5 | — |
|  | Crosslinking agent C for comparison[4) | — | — | — | — | — | — | 0.5 |
|  | Crosslinking agent D for comparison[5) | — | — | — | — | — | — | — |
|  | Crosslinking agent E for comparison[6) | — | — | — | — | — | — | — |
|  | Crosslinking agent F for comparison[7) | — | — | — | — | — | — | — |
|  | Antioxidant[8) | 0.3 | 0.3 | 0.3 | 0.3 | 0.3 | 0.3 | 0.3 |
| Evaluation | Amber in insulation layer | None | None | None | None | None | None | None |
|  | Degree of crosslinking of insulation layer (%) | 63 | 80 | 87 | 65 | 84 | 89 | 58 |
|  | AC breakdown voltage strength (kV/mm) | 45 | 57 | 61 | 47 | 60 | 62 | 40 |

|  |  | Control 10 | Control 11 | Control 12 | Control 13 | Control 14 | Control 15 | Control 16 |
|---|---|---|---|---|---|---|---|---|
| Inner semiconductor layer and outer semiconductor layer | Ethylene-ethyl acrylate copolymer[1) | 100 | 100 | 100 | 100 | 100 | 100 | 100 |
|  | Crosslinking agent A of invention[2) | — | — | — | — | — | — | — |
|  | Crosslinking agent[3) mixuture B of invention | — | — | — | — | — | — | — |
|  | Crosslinking agent C for comparison[4) | 2 | 5 | — | — | — | — | — |
|  | Crosslinking agent D for comparison[5) | — | — | 2 | 5 | — | — | — |
|  | Crosslinking agent E for comparison[6) | — | — | — | — | 2 | 5 | — |
|  | Crosslinking agent F | — | — | — | — | — | — | 2 |

TABLE 2-continued

| | | | | | | | | |
|---|---|---|---|---|---|---|---|---|
| | for comparison[7] | | | | | | | |
| | Antioxidant[8] | 0.5 | 0.5 | 0.5 | 0.5 | 0.5 | 0.5 | 0.5 |
| | Acetylene black | 60 | 60 | 60 | 60 | 60 | 60 | 60 |
| Insulation layer | Low-density[9] polyethylene | 100 | 100 | 100 | 100 | 100 | 100 | 100 |
| | Crosslinking agent A of invention[2] | — | — | — | — | — | — | — |
| | Crosslinking agent[3] mixuture B of invention | — | — | — | — | — | — | — |
| | Crosslinking agent C for comparison[4] | 2 | 5 | — | — | — | — | — |
| | Crosslinking agent D for comparison[5] | — | — | 2 | 5 | — | — | — |
| | Crosslinking agent E for comparison[6] | — | — | — | — | 2 | 5 | — |
| | Crosslinking agent F for comparison[7] | — | — | — | — | — | — | 2 |
| | Antioxidant[8] | 0.3 | 0.3 | 0.3 | 0.3 | 0.3 | 0.3 | 0.3 |
| Evaluation | Amber in insulation layer | Noticed | Noticed | None | Noticed | None | Noticed | None |
| | Degree of crosslinking of insulation layer (%) | 82 | 89 | 70 | 78 | 80 | 83 | 75 |
| | AC breakdown voltage strength (kV/mm) | 40 | 42 | 45 | 38 | 40 | 39 | 42 |

[1] M.I. = 15 g/10 min density = 0.93 g/cm$^3$
[2] m-(tert-butylperoxyisopropyl)-isopropylbenzene
[3] Mixture of m-(tert-butylperoxyisopropyl)-isopropylbenzene and p-(tert-butylperoxyisopropyl)-isopropylbenzene in the ratio 3:2 by weight
[4] Dicumyl peroxide
[5] Tert-butyl-cumyl peroxide
[6] 2,5-dimethyl 2,5-di(tert-butylperoxide) hexyne-3
[7] 1-(2-tert-butylperoxypropyl)-3-isopropenylbenzene
[8] 4,4'-thiobis(3-methyl-6-tert-butylphenol)
[9] M.I. = 1.0 g/10 min density = 0.928 g/cm$^3$ (Embodiments 7 to 12 and Controls 4 to 6)

An inner semiconductor layer 12 of 1-mm thickness, an insulation layer 13 of 11-mm thickness, and an outer semiconductor layer of 1-mm thickness were simultaneously extruded to be formed on a 250-mm$^2$ copper stranded wire 11, as shown in FIG. 1, by using the resin compositions shown in Table 2. After the resultant structures were crosslinked by heating at 10 kg/cm$^2$ and 270° C., a copper tape shield layer 16 of 0.6-mm thickness and a vinyl chloride sheath layer of 4-mm thickness were formed on each of the structures, whereupon crosslinked polyethylene insulated cables for 66-kV service were obtained. The preset temperature of the aforesaid extruder was set at 135° C. for the insulation layer and at 120° C. for the inner and outer semiconductor layers. Further, the mesh number of the screen attached to the extrusion orifice was 600 for the insulation layer and 350 for the inner and outer semiconductor layers.

These individual cables were examined for the presence of "amber" in the insulator, degree of crosslinking of the insulator, and AC breakdown voltage strength at 90° C. The results of the examination were shown in Table 2. In discriminating the presence of "amber," a slice of 0.5-mm thickness was cut from the insulation layer of the cables, and part of it having a volume of 1 cm$^3$ was observed by means of a microscope ($\times$100). When the number of "amber" spots was 10 or more, it was concluded that "amber" was noticed. The crosslinking agents C to F for comparison are identical with the ones shown in Table 1, individually.

Dicumyl peroxide as the crosslinking agent C for comparison, which is conventionally used, exhibited unsatisfactory external appearance at high temperature (Table 1), and "amber" is liable to occur. Since tert-butyl-cumyl peroxide as the crosslinking agent D for comparison is liable to vaporize, it cannot provide a satisfactory degree of crosslinking. The electrical property (AC breakdown voltage strength) of 2,5-dimethyl 2,5-di(tert-butylperoxy) hexyne-3 as the crosslinking agent E for comparison is poor, since its decomposition residue is crystallized. Although 1-(2-tert-butylperoxypropyl)-3-isopropenylbenzene as the crosslinking agent F for comparison is not susceptible to "amber," it cannot provide a satisfactory degree of crosslinking compared with its loading.

(Embodiments 13 to 18 and Controls 17 to 19)

Resin compositions of the formulations shown in Table 3 were extruded into tapes of 200-μm thickness, as semiconductive tapes for forming the inner semiconductor layers 22 at joints 10A of power cables, at the listed temperatures by means of extruders which have extrusion orifices fitted with mesh screens of the listed mesh sizes, and the appearance of each resultant tape was visually observed. Table 3 shows the results. In this table, circles, crosses, and triangles represent articles with good appearance, defectives, and partial defectives, respectively.

(Embodiments 19 to 24 and Controls 20 to 22)

The respective conductors of the 66-kV crosslinked polyethylene insulated cables, obtained according to Embodiments 7 to 12 and Controls 9 to 11 shown in Table 2, were exposed at their ends, the exposed conductors and their surroundings were sharpened like pencils, and the exposed conductors were connected by means of a compression sleeve (ferrule). By doing this, cable joins of Embodiments 19 to 24 and Controls 10 to 12 were prepared. The semiconductive tapes of Embodiments 13 to 18 and Controls 7 to 9, shown in Table 3 and obtained with use of a 600-mesh screen at a present extruder temperature of 135° C., were wound around and fusion-bonded to the respective peripheral surfaces of the conductors of the cables connected by means of the sleeve, whereby an inner semiconductor layer was formed for each joint. Thereafter, two split moulds were put on each of the conductor joints, and the resin compositions shown in Table 4 were extrusively injected into the moulds at 135° C. by means of an extruder of 25-mm diameter at the preset temperature of 135° C. Then, the moulds were heated to 200° C. for crosslinking, whereupon an insulation layer was formed. Thereafter, an outer semiconductor layer, formed of a heat-shrinkable conductive crosslinked polyethylene tube, and a shield layer sheath were put on each of the resultant structures, whereupon several cable joints were obtained. These cable joints were measured for the AC breakdown value (kV) at 90° C. The results of this measurement were shown in Table 4.

present invention are particularly useful to high-voltage service.

We claim:

1. In a rubber or plastic insulated power cable comprising a conductor and having formed thereon in the following order: at least an inner semiconductor layer and an insulation layer wherein at least one layer selected from the group consisting of said inner semiconductor layer and said insulation layer, is formed of a crosslinked structure of an olefin resin composition comprising an olefin resin and at least one crosslinking agent selected from the group consisting of m-(tert-

TABLE 3

|  |  | Embodiment 13 | Embodiment 14 | Embodiment 15 | Embodiment 16 | Embodiment 17 | Embodiment 18 | Control 17 | Control 18 | Control 19 |
|---|---|---|---|---|---|---|---|---|---|---|
| Ethylene-ethyl acrylate copolymer[1] | | 100 | 100 | 100 | 100 | 100 | 100 | 100 | 100 | 100 |
| m-(Tert-butylperoxyisopropyl)-isopropylbenzene | | 0.5 | 2 | 5 | — | — | — | — | — | — |
| Mixture of crosslinking agent[2] | | — | — | — | 0.5 | 3 | 5 | — | — | — |
| Dicumyl peroxide | | — | — | — | — | — | — | 0.5 | 2 | 5 |
| Antioxidant[3] | | 0.5 | 0.5 | 0.5 | 0.5 | 0.5 | 0.5 | 0.5 | 0.5 | 0.5 |
| Acetylene black | | 60 | 60 | 60 | 60 | 60 | 60 | 60 | 60 | 60 |
| 130° C.[4] | 350-mesh[5] | ○ | ○ | ○ | ○ | ○ | ○ | ○ | ○ | △ |
| | 600-mesh[5] | ○ | ○ | ○ | ○ | ○ | ○ | △ | X | X |
| 135° C.[4] | 350-mesh[5] | ○ | ○ | ○ | ○ | ○ | ○ | △ | X | X |
| | 600-mesh[5] | ○ | ○ | △ | ○ | ○ | △ | △ | X | X |

[1] M.I. = 15 g/10 min density = 0.93 g/cm$^3$
[2] Mixture of m-(tert-butylperoxyisopropyl)-isopropylbenzene and p-(tert-butylperoxyisopropyl)-isopropylbenzene in the ratio 3:2 by weight
[3] 4,4'-thiobis(3-methyl-6-tert-butylphenol)
[4] Preset extruder temperature
[5] Mesh screen attached to extrusion orifice of extruder

TABLE 4

|  |  | Embodiment 19 | Embodiment 20 | Embodiment 21 | Embodiment 22 | Embodiment 23 | Embodiment 24 | Control 20 | Control 21 | Control 22 |
|---|---|---|---|---|---|---|---|---|---|---|
| Insulation layer | Low-density polyethylene[1] | 100 | 100 | 100 | 100 | 100 | 100 | 100 | 100 | 100 |
| | m-(Tert-butyl-peroxyisopropyl)-isopropylbenzene | 0.5 | 2 | 5 | — | — | — | — | — | — |
| | Mixture of crosslinking agent[2] | — | — | — | 0.5 | 3 | 5 | — | — | — |
| | Dicumyl peroxide | — | — | — | — | — | — | 0.5 | 2 | 5 |
| | Antioxidant[3] | 0.3 | 0.3 | 0.3 | 0.3 | 0.3 | 0.3 | 0.3 | 0.3 | 0.3 |
| | AC breakdown value of cable joint (kV) | 450 | 593 | 611 | 467 | 618 | 624 | 302 | 394 | 313 |

[1] M.I. = 15 g/10 min density = 0.928 g/cm$^2$
[2] Mixture of m-(tert-butylperoxyisopropyl)-isopropylbenzene and p-(tert-butylperoxyisopropyl)-isopropylbenzene in the ratio 3:2 by weight
[3] 4,4'-thiobis(3-methyl-6-tert-butylphenol)

INDUSTRIAL APPLICABILITY

The resin composition for power cables according to the present invention contains an olefin resin, for use as the base, and m-(tert-butylperoxyisopropyl)-isopropylbenzene and/or p-(tert-butylperoxyisopropyl)-isopropylbenzene, for use as the crosslinking agent or agents. In manufacturing the power cables, therefore, the preset temperature of the extruder can be set higher than in the manufacture of conventional power cables which use an olefin resin composition containing dicumyl peroxide as the crosslinking agent. It is possible, therefore, to use an olefin resin with a high melting point (about 110° C. or more) which conventionally has not been easily applicable. Thus, the high-temperature properties and durability of the power cables can be improved, and the reliability of the power cables can be considerably improved.

The resin composition for power cables, the power cables using the same, and the power cable joint of the present invention are particularly useful to high-voltage service.

We claim:

1. In a rubber or plastic insulated power cable comprising a conductor and having formed thereon in the following order: at least an inner semiconductor layer and an insulation layer wherein at least one layer selected from the group consisting of said inner semiconductor layer and said insulation layer, is formed of a crosslinked structure of an olefin resin composition comprising an olefin resin and at least one crosslinking agent selected from the group consisting of m-(tert-butylperoxyisopropyl)-isopropylbenzene and p-(tert-butylperoxyisopropyl)-isopropylbenzene.

2. In a rubber or plastic insulated power cable comprising a conductor and having formed thereon in the following order: at least an inner semiconductor layer, an insulation layer, and an outer semiconductor layer formed thereon wherein at least one layer selected from the group consisting of said inner semiconductor layer, said insulation layer, and said outer semiconductor layer, is formed of a crosslinked structure of an olefin resin composition comprising an olefin resin and at least one crosslinking agent selected from the group consisting of m-(tert-butylperoxyisopropyl)-isopropylbenzene and p-(tert-butylperoxyisopropyl)-isopropylbenzene.

3. The power cable according to claim 1 or 2, wherein said olefin resin composition contains 0.5 to 5 parts by weight of m-(tert-butylperoxyisopropyl)-isopropylbenzene and/or p-(tert-butylperoxyisopropyl)-isopropylbenzene, based on 100 parts by weight of the olefin resin.

4. The power cable according to claim 3, wherein said olefin resin composition further contains at least one antioxidant selected from the group consisting of 4,4'-thiobis(3-methyl-6-tert-butylphenol) and bis[2-methyl-4-(3-n-alkylthiopropionyloxy)-5-tert-butylphenyl] sulfide.

5. The power cable according to claim 1 to 5, wherein said olefin resin composition further contains 4,4'-thiobis(3-methyl-6-tert-butylphenol) and/or bis[2-methyl-4-(3-n-alkylthiopropionyloxy)-5-tert-butylphenyl] sulfide as an antioxidant or antioxidants.

6. The power cable according to claim 1, wherein said olefin resin composition contains 1.5 to 3 parts by weight of m-(tert-butylperoxyisopropyl)-isopropylbenzene and/or p-(tert-butylperoxyisopropyl)-isopropylbenzene, based on 100 parts by weight of the olefin resin.

7. The power cable according to claim 6, wherein said olefin resin composition further contains at least one antioxidant selected from the group consisting of 4,4'-thiobis(3-methyl-6-tert-butylphenol), bis[2-methyl-4-(3-n-alkylthiopropionyloxy)-5-tert-butylphenyl] sulfide, 2,5-di-tert-butyl hydroquinone, 2,6-di-tert-butyl-p-cresol, 2,2'-thiodiethylenebis-[3-(3,5-di-tert-butyl-4-hydroxyphenyl) propionate], dilauryl thiodipropionate and distearyl thiodipropionate, said antioxidant being in an amount of 0.05 to 1.0 part by weight based on 100 parts by weight of said olefin resin.

8. The joint system according to claim 7, wherein said olefin resin composition further contains at least one antioxidant selected from the group consisting of 4,4'-thiobis(3-methyl-6-tert-butylphenol), bis[2-methyl-4-(3-n-alkylthiopropionyloxy)-5-tert-butylphenyl] sulfide, 2,5-di-tert-butyl hydroquinone, 2,6-di-tert-butyl-p-cresol, 2,2'-thiodiethylenebis-[3-(3,5-di-tert-butyl-4-hydroxyphenyl) propionate], dilauryl thiodipropionate and distearyl thiodipropionate, said antioxidant being in an amount of 0.05 to 1.0 part by weight based on 100 parts by weight of said olefin resin.

9. The power cable according to claim 1, wherein the olefin resin is selected from the group consisting of polyethylene, ethylene propylene rubber, ethylene-ethyl acrylate copolymer, ethylene-vinyl acetate copolymer, ethylene-acrylic acid copolymer and ethylene-styrene copolymer.

10. The power cable according to claim 2, wherein said olefin resin composition further contains at least one antioxidant selected from the group consisting of 4,4'-thiobis(3-methyl-6-tert-butylphenol) and bis[2-methyl-4-(3-n-alkylthiopropionyloxy)-5-tert-butylphenyl] sulfide.

11. The power cable according to claim 10, wherein the insulation layer contains 100 parts by weight of low-density polyethylene with a M.I. of 0.5 to 5.0 g/10 minutes and a density of 0.920 to 0.940 g/cm$^3$ compounded with 1.5 to 3 parts by weight of m-(tert-butylperoxyisopropyl)-isopropylbenzene and/or p-(tert-butylperoxyisopropyl)-isopropylbenzene and 0.05 to 1.0 part per weight of 4,4'-thiobis(3-methyl-6-tert-butylphenol); and the inner semiconductor layer and the outer semiconductor layer both contain 100 parts by weight of an ethylene-ethyl acrylate copolymer or an ethylene-vinyl acetate copolymer with a M.I. of 10 to 20 g/10 minutes and a density of 0.93 to 0.96 g/cm$^3$ compounded with 1.5 to 3 parts by weight of m-(tert-butylperoxyisopropyl)-isopropylbenzene and 0.05 to 1.0 part per weight of 4,4'-thiobis(3-methyl-6-tert-butylphenol) and further compounded with 20 to 100 parts by weight of acetylene black.

12. The power cable according to claim 2, wherein said olefin resin composition contains 1.5 to 3 parts by weight of m-(tert-butylperoxyisopropyl)-isopropylbenzene and/or p-(tert-butylperoxyisopropyl)-isopropylbenzene, based on 100 parts by weight of the olefin resin.

13. The power cable according to claim 12, wherein said olefin resin composition further contains at least one antioxidant selected from the group consisting of 4,4'-thiobis(3-methyl-6-tert-butylphenol), bis[2-methyl-4-(3-n-alkylthiopropionyloxy)-5-tert-butylphenyl] sulfide, 2,5-di-tert-butyl hydroquinone,2,6-di-tert-butyl-p-cresol,2,2'-thiodiethylenebis-[3-(3,5-di-tert-butyl-4-hydroxyphenyl) propionate], dilauryl thiodipropionate and distearyl thiodipropionate, said antioxidant being in an amount of 0.05 to 1.0 part by weight based on 100 parts by weight of said olefin resin.

14. The power cable according to claim 2, wherein the olefin resin is selected from the group consisting of polyethylene, ethylene propylene rubber, ethylene-ethyl acrylate copolymer, ethylene-vinyl acetate copolymer, ethylene-acrylic acid copolymer and ethylene-styrene copolymer.

15. In a joint system for power cables, which comprises a conductor joint between two rubber or plastic insulated power cables, said power cables having a conductor core, an inner semiconductor layer, an insulation layer and an outer semiconductor layer, said conductor joint having an inner semiconductor layer, an insulation layer, and an outer semiconductor layer, successively formed thereon or around the vicinities thereof, wherein at least one layer selected from the group consisting of said inner semiconductor layer, said insulation layer, and said outer semiconductor layer, is formed of a crosslinked structure of an olefin resin composition comprising an olefin resin and at least one crosslinking agent selected from the group consisting of m-(tert-butylperoxyisopropyl)-isopropylbenzene and p-(tert-butylperoxyisopropyl)-isopropylbenzene.

16. The joint system for power cables according to claim 15, wherein said olefin resin composition contains 0.5 to 5 parts by weight of m-(tert-butylperoxyisopropyl)-isopropylbenzene and/or p-(tert-butylperoxyisopropyl)-isopropylbenzene, based on 100 parts by weight of the olefin resin.

17. The joint system for power cables according to claim 15 or 16, wherein said olefin resin composition further contains 4,4'-thiobis(3-methyl-6-tert-butylphenol) and/or bis[2-methyl-4-(3-n-alkylthiopropionyloxy)-5-tert-butylphenyl]sulfide as an antioxidant or antioxidants.

18. The joint system according to claim 15, wherein said olefin resin composition contains 1.5 to 3 parts by weight of m-(tert-butylperoxyisopropyl)-isopropylbenzene and/or p-(tert-butylperoxyisopropyl)-isopropylbenzene, based on 100 parts by weight of the olefin resin.

19. The joint system according to claim 15, wherein the olefin resin is selected from the group consisting of polyethylene, ethylene propylene rubber, ethylene-ethyl acrylate copolymer, ethylene-vinyl acetate copolymer, ethylene-ethylene-acrylic acid copolymer and ethylene-styrene copolymer.

20. The joint according to claim 15, wherein the insulation layer contains 100 parts by weight of low-density polyethylene with a M.I. of 0.5 to 5.0 g/10 minutes and a density of 0.920 to 0.940 g/cm³ compounded with 1.5 to 3 parts by weight of m-(tert-butylperoxyisopropyl)-isopropylbenzene and/or p-(tert-butylperoxyisopropyl)-isopropylbenzene and 0.05 to 1.0 part per weight of 4,4'-thiobis(3-methyl-6-tert-butylphenol); and the inner semiconductor layer and the outer semiconductor layer both contain 100 parts by weight of an ethylene-ethyl acrylate copolymer or an ethylene-vinyl acetate copolymer with a M.I. of 10 to 20 g/10 minutes and a density of 0.93 to 0.96 g/cm³ compounded with 1.5 to 3 parts by weight of m-(tert-butylperoxyisopropyl)-isopropylbenzene and 0.05 to 1.0 part per weight of 4,4'-thiobis(3-methyl-6-tert-butylphenol) and further compounded with 20 to 100 parts by weight of acetylene black.

* * * * *